US010358388B2

(12) United States Patent
Yun et al.

(10) Patent No.: US 10,358,388 B2
(45) Date of Patent: Jul. 23, 2019

(54) DIELECTRIC COMPOSITION AND MULTILAYER ELECTRONIC COMPONENT

(71) Applicant: SAMSUNG ELECTRO-MECHANICS CO., LTD., Suwon-Si, Gyeonggi-Do (KR)

(72) Inventors: Ki Myoung Yun, Suwon-Si (KR); Dong Jun Jung, Suwon-Si (KR); Jae Sung Park, Suwon-Si (KR); Tae Young Ham, Suwon-Si (KR); Hyung Soon Kwon, Suwon-Si (KR); Jong Han Kim, Suwon-Si (KR); Hyoung Uk Kim, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/889,856

(22) Filed: Feb. 6, 2018

(65) Prior Publication Data
US 2019/0135701 A1 May 9, 2019

(30) Foreign Application Priority Data
Nov. 6, 2017 (KR) .......................... 10-2017-0146492

(51) Int. Cl.
| | |
|---|---|
| H01G 4/10 | (2006.01) |
| C04B 35/468 | (2006.01) |
| C04B 35/49 | (2006.01) |
| H01G 4/12 | (2006.01) |
| H01G 4/232 | (2006.01) |
| H01G 4/30 | (2006.01) |
| H01G 4/012 | (2006.01) |

(52) U.S. Cl.
CPC ....... *C04B 35/4682* (2013.01); *H01G 4/1227* (2013.01); *H01G 4/1236* (2013.01);
(Continued)

(58) Field of Classification Search
CPC .................. C04B 34/4682; H01G 4/1227; H01G 4/1245
See application file for complete search history.

(56) References Cited

U.S. PATENT DOCUMENTS 6,853,536 B2 *  2/2005  Nakamura ........... H01G 4/1227
                                                361/301.2
8,064,190 B2 * 11/2011  Taniguchi ........... C04B 35/4682
                                                361/321.4
(Continued)

FOREIGN PATENT DOCUMENTS

JP  2006-287046 A   10/2006
JP  4110978 B2       7/2008
(Continued)

OTHER PUBLICATIONS

Office Action issued in Korean Application No. 10-2017-0146492 dated Oct. 31, 2018, with English translation.

*Primary Examiner* — Karl E Group
(74) *Attorney, Agent, or Firm* — Morgan, Lewis & Bockius LLP (57) ABSTRACT

A multilayer electronic component includes: a body including first and second internal electrodes alternately disposed with respective dielectric layers interposed therebetween; and first and second external electrodes disposed on the body to be connected to the first and second internal electrodes, respectively, wherein each of the dielectric layers includes $Ba_mTiO_3$ and includes a plurality of grains and grain boundaries formed between adjacent grains, and a sum of contents of Si and Dy in the grain boundary is 10 to 15 parts by weight.

18 Claims, 6 Drawing Sheets

(52) U.S. Cl.
CPC .............. *H01G 4/232* (2013.01); *H01G 4/30* (2013.01); *C04B 2235/3217* (2013.01); *C04B 2235/3224* (2013.01); *C04B 2235/3236* (2013.01); *C04B 2235/3239* (2013.01); *C04B 2235/3263* (2013.01); *C04B 2235/3418* (2013.01); *C04B 2235/442* (2013.01); *C04B 2235/768* (2013.01); *C04B 2235/85* (2013.01); *H01G 4/012* (2013.01)

(56) References Cited

U.S. PATENT DOCUMENTS

| | | | |
|---|---|---|---|
| 8,582,277 B2 * | 11/2013 | Tanaka | H01G 4/1227 361/321.4 |
| 9,036,331 B2 * | 5/2015 | Yoon | C04B 35/4682 361/321.4 |
| 9,959,976 B2 * | 5/2018 | Yoon | C01G 25/02 |
| 2004/0145856 A1 | 7/2004 | Nakamura et al. | |
| 2009/0073635 A1 | 3/2009 | Taniguchi | |
| 2012/0162858 A1 | 6/2012 | Tanaka et al. | |
| 2013/0083449 A1 | 4/2013 | Yoon et al. | |
| 2017/0271082 A1 | 9/2017 | Yoon et al. | |

FOREIGN PATENT DOCUMENTS

| | | |
|---|---|---|
| JP | 2009-044017 A | 2/2009 |
| JP | 2012-129508 A | 7/2012 |
| KR | 10-2013-0036595 A | 4/2013 |
| KR | 10-1751177 B1 | 6/2017 |

* cited by examiner

DIELECTRIC COMPOSITION AND MULTILAYER ELECTRONIC COMPONENT

CROSS-REFERENCE TO RELATED APPLICATION(S)

This application claims the benefit of priority to Korean Patent Application No. 10-2017-0146492, filed on Nov. 6, 2017 in the Korean Intellectual Property Office, the disclosure of which is incorporated herein by reference in its entirety.

BACKGROUND

1. Field

The present disclosure relates to a dielectric composition and a multilayer electronic component.

2. Description of Related Art

Modern smartphones may use a large number of multilayer electronic components, on the order of about one thousand multilayer electronic components, and demand for miniaturization and an increase in the capacity of multilayer electronic components has thus increased.

In order to meet such demand, dielectric layers and internal electrodes should be thinned, and dielectric layers have been recently required to have a relatively low thickness of 500 nm.

However, when the dielectric layers are thinned as described above, a voltage applied across dielectric layers may be increased, such that a defect in a fine structure may occur. Therefore, withstand voltage characteristics such as a breakdown voltage (BDV), high temperature insulation (IR), and the like, may be deteriorated, and it may thus be difficult to secure reliability in the multilayer electronic components.

Therefore, it is important to secure technology for a dielectric composition capable of enabling the thinning of dielectric layers, while significantly reducing degradation in the reliability of multilayer electronic components and implementing high dielectric properties.

SUMMARY

An aspect of the present disclosure may provide a dielectric composition and a multilayer electronic component having excellent dielectric properties implemented therein and preventing degradation in reliability of the multilayer electronic component while increasing the thinness of dielectric layers.

According to an aspect of the present disclosure, a dielectric composition may include: a base material powder including $Ba_mTiO_3$ (0.995≤1.010), $(Ba,Ca)(Ti,Zr)O_3$, $Ba(Ti,Zr)O_3$, or $(Ba,Ca)(Ti,Sn)O_3$ modified from $Ba_mTiO_3$ by partially dissolving calcium (Ca), zirconium (Zr), or tin (Sn) in $Ba_mTiO_3$; a first accessory component including one variable-valence acceptor element oxide or carbonate of manganese (Mn), chromium (Cr), iron (Fe), cobalt (Co), copper (Cu), and zinc (Zn) and one fixed valence acceptor element oxide or carbonate of magnesium (Mg) and zirconium (Zr); a second accessory component including an oxide or a carbonate including silicon (Si) or glass including silicon (Si); a third accessory component including BaO or $BaCO_3$; and a fourth accessory component including Dy and $V_2O_5$, wherein a sum of contents of Si and Dy in a grain boundary formed between adjacent dielectric compositions is 10 to 15 parts by weight based on 100 parts by weight of an overall amount of an oxide in the grain boundary.

A content of Mg of the first accessory component may be 0.5 parts by weight or less based on 100 parts by weight of an overall amount of an oxide or a carbonate.

The second accessory component may further include an oxide or a carbonate including aluminum (Al).

The fourth accessory component may further include one rare earth element of Y, Gd, Sm, Nd, Tb, Eu, Yb, Er, and Lu.

According to another aspect of the present disclosure, a multilayer electronic component may include: a body including first and second internal electrodes alternately disposed with respective dielectric layers interposed therebetween; and first and second external electrodes disposed on the body to be connected to the first and second internal electrodes, respectively, wherein each of the dielectric layers includes $Ba_mTiO_3$ and includes a plurality of grains and grain boundaries formed between adjacent grains, and a sum of contents of Si and Dy in the grain boundary is 10 to 15 parts by weight.

In the grain boundary of the dielectric layer, a ratio (Dy/Si) of Dy to Si may be 1.0 to 1.6.

A thickness of the grain boundary of the dielectric layer may be 0.7 to 1.5 nm.

The grain boundary of the dielectric layer may include a dielectric grain having a core-shell structure, and a size of the grain may be 50 to 500 nm and a thickness of the dielectric layer may be 0.9 μm or less.

A thickness deviation ((thickness standard deviation/thickness average value)×100) of the grain boundary may be 10 or less.

The first and second internal electrodes may include Ni or Ni alloys.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
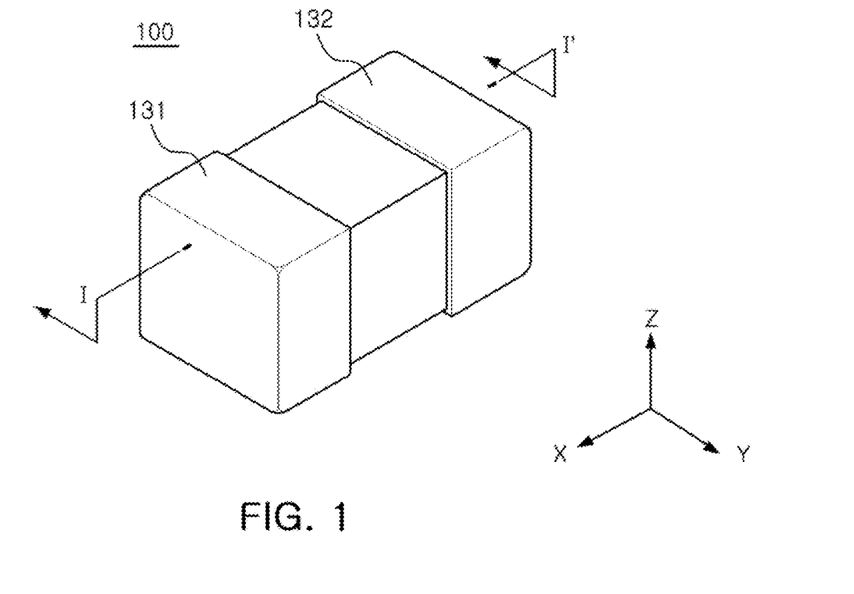
FIG. 1 is a schematic perspective view illustrating a multilayer electronic component according to an exemplary embodiment in the present disclosure.
Figure 2:
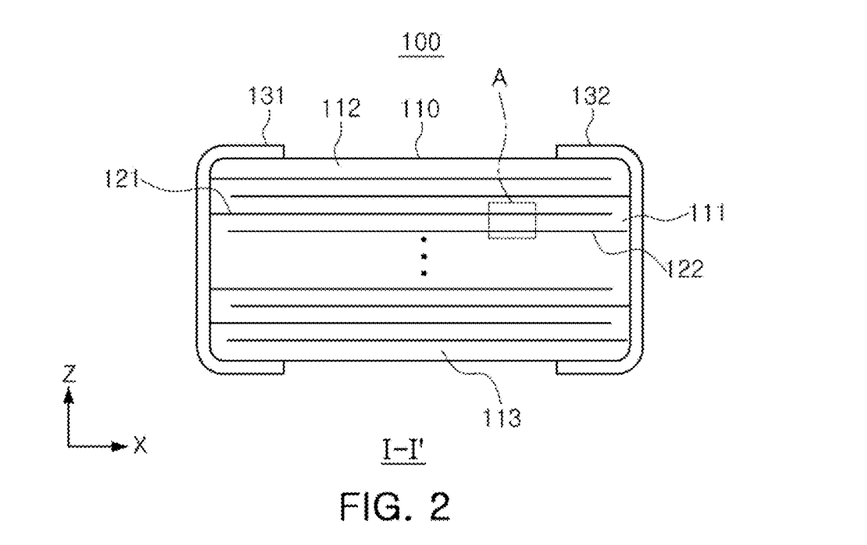
FIG. 2 is a cross-sectional view taken along line I-I' of FIG. 1.
Figure 3:
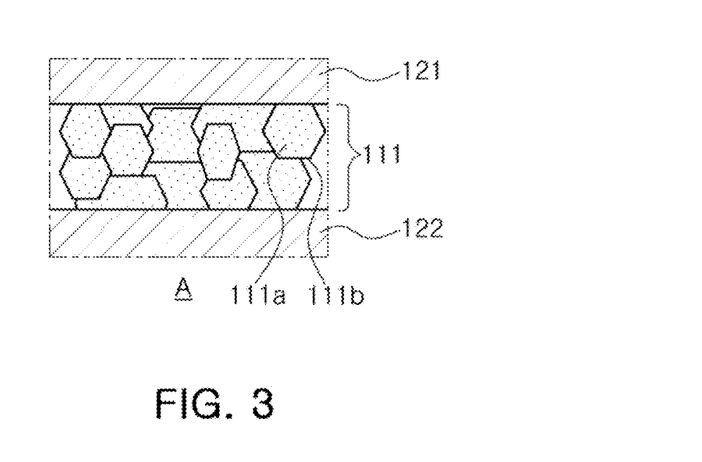
FIG. 3 is an enlarged cross-sectional view illustrating region A of FIG. 2.

Referring to FIGS. 1 through 3, a multilayer electronic component 100 according to the present exemplary embodiment may include a body 110 and first and second external electrodes 131 and 132.

The body 110 may include dielectric layers 111 and first and second internal electrodes 121 and 122 having different polarities and alternately disposed with respective dielectric layers 111 interposed therebetween.

A shape of the body 110 is not particularly limited, but may be a rectangular parallelepiped shape.

In addition, dimensions of the body 110 are not particularly limited, but may be appropriate dimensions depending on an intended purpose of the multilayer electronic component.

In addition, covers 112 and 113 may be provided at upper and lower ends of the body 110, respectively.

A thickness of each of the dielectric layers 111 may be arbitrarily changed, depending on a capacitance design of a multilayer capacitor. In this case, when a thickness of the dielectric layer 111 is excessively small, the number of grains existing in one dielectric layer may be small, to have a negative influence on reliability of the multilayer capacitor.

The first and second internal electrodes 121 and 122 may be stacked so that end surfaces thereof are exposed, respectively, through opposite surfaces of the body 110, opposing each other in an X direction.

A conductive material contained in each of the first and second internal electrodes 121 and 122 is not particularly limited, but may be a metal such as Ni, or the like.

In addition, when the dielectric layer is formed of a dielectric component according to the present exemplary embodiment, the body may be sintered under a reducing atmosphere of 1,300° C. or less, and Ni or an Ni alloy may thus be used as a material of each of the first and second internal electrodes. Therefore, a dielectric constant of the multilayer electronic component may be increased, and high temperature withstand voltage characteristics of the multilayer electronic component may be improved.

In this case, as the Ni alloy, Ni and one or more selected from the group consisting of Mn, Cr, Co, S, Sn, and Al may be used.

The first and second external electrodes 131 and 132 may be formed on opposite end surfaces of the body 110, respectively, and may be electrically connected, respectively, to the first and second internal electrodes 121 and 122 alternately disposed in the body 110.

The first and second external electrodes 131 and 132 may surround the opposite end surfaces of the body 110 in the X direction, respectively, and may be electrically connected to the end surfaces of the first and second internal electrodes 121 and 122, alternately exposed through third and fourth surfaces of the body 110, respectively, to constitute a capacitor circuit.

In this case, a conductive material contained in each of the first and second external electrodes 131 and 132 is not particularly limited, but may be Ni or Cu having excellent conductivity, or alloys thereof.

In the present exemplary embodiment, each of the dielectric layers 111 constituting the body 110 may contain a non-reducible dielectric composition, sinterable under a reducing atmosphere and satisfies X5R or X7R characteristics specified in an electronic industries association (EIA) standard.

The dielectric composition according to the present exemplary embodiment may include a base material powder including $Ba_mTiO_3$ (0.995≤m≤1.010), (Ba,Ca)(Ti,Zr)$O_3$, $Ba(Ti,Zr)O_3$, or $(Ba,Ca)(Ti,Sn)O_3$ modified from $Ba_mTiO_3$ by partially dissolving calcium (Ca), zirconium (Zr), or tin (Sn) in $Ba_mTiO_3$; a first accessory component including one variable-valence acceptor element oxide or carbonate of manganese (Mn), chromium (Cr), iron (Fe), cobalt (Co), copper (Cu), and zinc (Zn) and one fixed valence acceptor element oxide or carbonate of magnesium (Mg) and zirconium (Zr); a second accessory component including an oxide or a carbonate including silicon (Si) or glass including silicon (Si); a third accessory component including BaO or $BaCO_3$; and a fourth accessory component including Dy and $V_2O_5$.

The respective components of the dielectric composition according to an exemplary embodiment in the present disclosure will hereinafter be described in more detail.

a) Base Material Powder

As the base material powder, a main component of the dielectric composition, a $Ba_mTiO_3$ (0.995≤1.010) based dielectric powder may be used.

Here, when m is less than 0.995, the $Ba_mTiO_3$ based dielectric powder may be easily reduced in sintering under a reducing atmosphere to be easily changed into a semiconducting material, and when m exceeds 1.010, a problem in which a sintering temperature increases excessively may occur.

In addition, the base material powder may include (Ba, Ca)(Ti,Zr)$O_3$, $Ba(Ti,Zr)O_3$, or $(Ba,Ca)(Ti,Sn)O_3$ modified from $Ba_mTiO_3$ by partially dissolving calcium (Ca), zirconium (Zr), or tin (Sn) in $Ba_mTiO_3$.

b) First Accessory Component

The dielectric composition may include the variable-valence acceptor element oxide or carbonate and the fixed valence acceptor element oxide or carbonate as the first accessory component.

A variable-valence acceptor element may be one of manganese (Mn), chromium (Cr), iron (Fe), cobalt (Co), copper (Cu), and zinc (Zn), and a fixed valence acceptor element may be one of magnesium (Mg) and zirconium (Zr).

The fixed valence acceptor element oxide or carbonate may serve to provide a non-reducible property, improve a dielectric constant, and maintain a more stable high temperature accelerated life, and a form of the fixed valence acceptor element oxide or carbonate is not particularly limited.

c) Second Accessory Component

The dielectric composition may include the oxide or the carbonate including silicon (Si) or the glass including silicon (Si) as the second accessory component. The second accessory component may serve to lower a sintering temperature and react to the base material powder, the main component, or other accessory components to promote sinterability.

In addition, the second accessory component may further include an oxide or a carbonate including aluminum (Al).

d) Third Accessory Component

The dielectric composition may include BaO or $BaCO_3$ as the third accessory component. The third accessory component may serve to control a non-reducible property and grain growth and provide sintering stability.

e) Fourth Accessory Component

The dielectric composition may include Dy and $V_2O_5$ as the fourth accessory component. The fourth accessory component may serve to improve reliability.

In addition, the fourth accessory component may further include a rare earth element. The rare earth element may serve to improve a high temperature accelerated life and stabilize a capacitance change at a phase change temperature Tc or more to secure desired temperature characteristics.

Here, the rare earth element may be at least one selected from the group consisting of Gd, Sm, Nd, Tb, Eu, Yb, Er, and Lu. However, the rare earth element according to the present disclosure is not limited thereto.

The dielectric layer 111 according to the present exemplary embodiment may include ceramic particles (grains) including the dielectric composition and grain boundary portions (grain boundaries) existing between the ceramic particles.

Here, the ceramic particle may include a core portion 111a and a shell portion 111b surrounding the core portion 111a, and the first to fourth accessory components of the dielectric composition may be unevenly included in the core portion 111a or the shell portion 111b.

In addition, the ceramic particle may exist in a grain boundary existing between two adjacent grains.

In this case, a dielectric grain boundary of the dielectric layer 111 may include a grain having a core-shell structure, the grain may have a size of 50 to 500 nm, and the dielectric layer may have a thickness of 0.9 μm or less.

In addition, in the present exemplary embodiment, the sum of contents of Si, the second accessory component, and Dy, the fourth accessory component, in the grain boundary may be 10 to 15 parts by weight based on 100 parts by weight of the an overall amount of an oxide. In this case, the sum may be a content based on 100 parts by weight of an overall amount of an oxide when Si is converted into $SiO_2$, Dy is converted into $Dy_2O_3$, and Mg, Al, Ti, V, Mn, Ni, Zr, Ba, Dy, and the like, are converted into the respective oxides.

Therefore, a defect related to a concentration of oxygen vacancy may be reduced, and a vulnerable portion of the grain boundary may be improved, such that dielectric constant and breakdown voltage (BDV) dispersion and insulation (IR) degradation at a high temperature may be suppressed.

In addition, in the grain boundary of the dielectric layer, a concentration ratio (Dy/Si) of Dy to Si may be 1.0 to 1.6.

In addition, a thickness of the grain boundary of the dielectric layer may be 0.7 to 1.5 nm.

When the thickness of the grain boundary exceeds 1.5 nm, a fraction of the grain boundary may be increased, such that a fraction of the grain may be relatively reduced, and a dielectric constant may thus be reduced, and contents of the accessory components may become excessively large, such that a withstand voltage may be reduced, resulting in degradation of electrical characteristics and reliability of the multilayer electronic component.

When the thickness of the grain boundary is less than 0.7 nm, uniformity of the grain boundary may be reduced, such that an electric field may be concentrated on one point, resulting in degradation of reliability of the multilayer electronic component.

In addition, a thickness deviation CV of the grain boundary may be 10 or less. Here, CV may be calculated by Equation: standard deviation/average value×100.

The meaning that the thickness deviation CV of the grain boundary exceeds 10 is that a thickness of the grain boundary is generally non-uniform. In this case, the dielectric layer may be non-uniformly grain-grown, such that the grain boundary may be non-uniformly formed. Resultantly, an electrically vulnerable portion may be formed in a capacitor body to degrade the reliability of the multilayer electronic component.

In a multilayer electronic component according to the related art, when a dielectric layer is thinned, a fraction of the grain boundary per unit dielectric is reduced, such that insulation resistance of the grain boundary becomes higher than that of grain interior. According to the present exemplary embodiment, even in the case that the dielectric layer is thinned, high insulation resistance may be maintained.

In the following Experimental Example, reliability of a final multilayer electronic component is checked in a state in which contents of additives of the dielectric composition are controlled in order to segregate Si and Dy in the grain boundary by predetermined concentrations or more and concentrations of the additives detected in the grain boundary of the dielectric layer of the final multilayer electronic component are made to be different from each other.

In this case, evaluation was performed on a multilayer ceramic capacitor manufactured to have X5R characteristics through the following processes, and the following Tables represent BDV dispersion and high temperature reliability results depending on contents of additives detected in a dielectric layer-grain boundary of a final product according to a dielectric composition control.

Experimental Example

Processes of manufacturing a multilayer capacitor used for experimentation are as follows.

First, $BaTiO_3$ having a level of 100 nm was used as a base material powder of the dielectric component, and $Dy_2O_3$, $BaCO_3$, $Mn_3O_4$, $V_2O_5$, $Al_2O_3$, $SiO_2$, and $MgCO_3$ were injected as accessory components.

In this case, 2 mol % $Dy_2O_3$, 2.5 mol % of $BaCO_3$, 0.25 mol % of $Mn_3O_4$, 0.25 mol % of $V_2O_5$, 0.5 mol % of $Al_2O_3$, and 0.5 mol % of $MgCO_3$ were used based on 100 mol of $BaTiO_3$.

In this case, contents of $SiO_2$ and $Dy_2O_3$ were further controlled depending on compositions and contents listed in Table 1 to prepare raw material powders, and these raw material powders were mixed with zirconia balls and then used as dispersing media, were mixed with a dispersing agent and a binder using ethanol and toluene as solvents and then ball-milled for about 20 hours, and were mixed with a binder in order to implement strength in a dielectric sheet to prepare a slurry.

The slurry prepared as described above was used to manufacture a ceramic sheet having a thickness of 1.0 μm using a small coater in a doctor blade manner in order to manufacture an X5R multilayer ceramic capacitor (MLCC) specimen.

Then, internal electrodes were printed on formed ceramic sheets using Ni, thirty sheets each having a thickness of 3 μm were stacked as upper and lower covers, respectively, to form a laminate, a compressing process was performed on the laminate to manufacture a compressed bar, and the compressed bar was diced to be chips having lengths and widths of 1.0 mm×0.5 mm and 0.6 mm×0.3 nm using a dicer.

The chip diced as described above was plasticized under an air atmosphere of 400° C. for the purpose of debinding, and was then sintered for one hour in a condition of about 1,130° C., a hydrogen concentration of 0.1%, and $H_2$. Then, the sintered chip was heat-treated for three hours under an $N_2$ atmosphere of 1000° C. for re-oxidation, and was then subjected to a termination process and an electrode sintering process using a Cu paste, such that a multilayer capacitor was completed. Then, capacitance of the multilayer capacitor, BDV dispersion of the multilayer capacitor, and resistance degradation of the multilayer capacitor depending on a voltage step increase at a high temperature 150° C. were measured.

In this case, a size of a grain of a dielectric layer was 500 nm or less, and a thickness of the dielectric layer was 0.9 µm or less.

[Evaluation]

Capacitance and dielectric loss of the chip in room temperature were measured using an LCR meter in a condition of 1 kHz and AC 0.5 V/µm, BDV dispersion of the chip means a ratio of a minimum value to an average value of measured values measured with respect to twenty samples taken for each exemplary embodiment. When a BDV minimum value is less than 60% of an average value, it was determined to be defective.

A high temperature reliability test (for example, a high temperature accelerated lift test) was performed by measuring insulation (IR) at an interval of 5 seconds for three hours in a condition of 105° C. and AC 17V/µm with respect to forty samples taken for each exemplary embodiment, and high temperature IR dispersion means a frequency of the chip of which an insulation resistance value is reduced to 10E8 ohm or less.

The following Table 1 represents, BDV dispersion, and high temperature reliability of a multilayer capacitor changed depending on contents of Si and Dy and a weight ratio of Dy to Si. Here, BDV dispersion is determined to be good (◯) when a BDV minimum value is 80% or more of an average value, is determined to be ordinary (Δ) when a BDV minimum value is 60% or more of an average value, and is determined to be defective (×) when a BDV minimum value is less than 60% of an average value. Similarly, high temperature IR dispersion is determined to be good (◯) when a high temperature reliability minimum value is 1.E+08 ohm or more, is determined to be ordinary (Δ) when a high temperature reliability minimum value is 1.E+07 ohm or more, and is determined to be defective (×) when a high temperature reliability minimum value is less than 1.E+07 ohm.

Referring to Table 1, contents of the respective additives in the grain boundary may be changed depending on properties and contents of additives added after mixing and dispersing processes.

In an entire experiment, it was confirmed that concentrations of Dy and Si generally tend to be increased together. Therefore, in order to secure reliability of the multilayer capacitor, that is, BDV dispersion at an ultrathin layer having a thickness of 0.6 µm and high insulation resistance at a high temperature, a concentration of Si+Dy in the grain boundary is 10 to 15 parts by weight based on 100 parts by weight of oxide.

Figure 4:
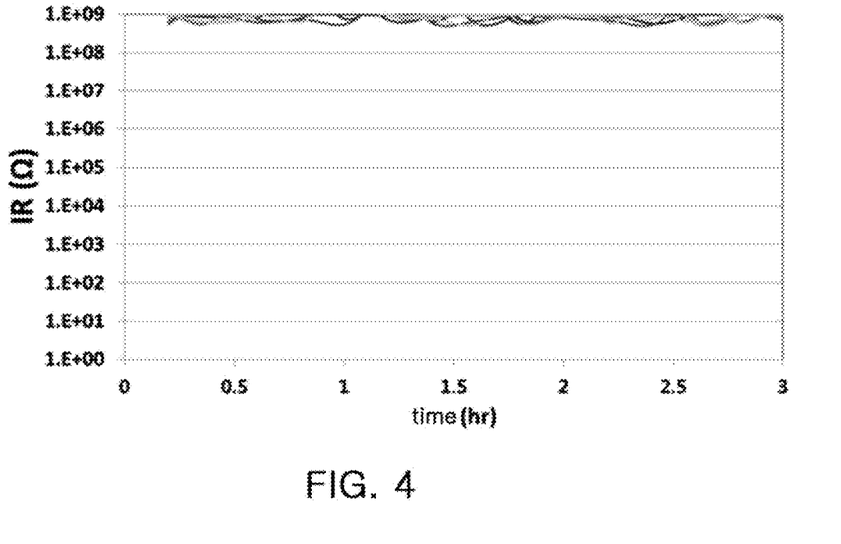
FIGS. 4 and 5 are graphs illustrating measurement results of an accelerated lifespan in a multilayer capacitor of which a thickness of a dielectric layer is about 0.7 μm, a rated voltage is 6.3V, and a length and a width are 0.6 mm×0.3 mm.
Figure 5:
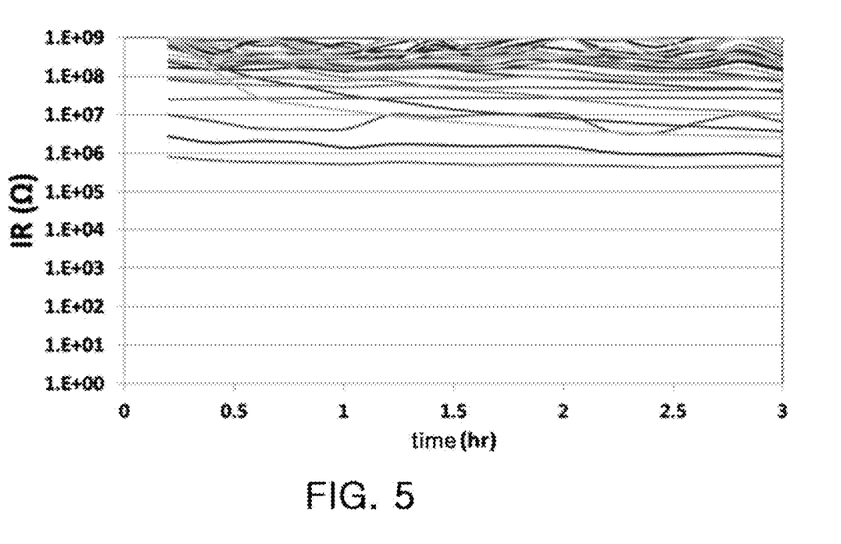

FIGS. 4 and 5 are graphs illustrating measurement results of an accelerated lifespan in a multilayer capacitor of which a thickness of a dielectric layer is about 0.7 µm, a rated voltage is 6.3 V, and a length and a width are 0.6 mm×0.3 mm. The color lines in FIG. 4 indicate the forty multilayer capacitors having features of #11 in Table 1, respectively. Further, the color lines in FIG. 5 indicate the forty multilayer capacitors having features of #1 in the Table 1, respectively.

As illustrated in FIG. 4, high temperature IR was measured for three hours as in a horizontal axis of the graph with respect to forty samples, and the respective color lines illustrated in the graph indicate the high temperature IR levels derived from the forty samples, respectively.

In addition, measured values in a range from 1.E+06 to 1.E+0.9 may be determined to be normal.

Referring to FIG. 4, it may be appreciated that when the sum of contents of Si and Dy in the grain boundary is 10 parts by weight or more based on 100 parts by weight of the an overall amount of an oxide, the high temperature IR levels of all samples of 85° C. is maintained as $10^8 \Omega$ or more.

When the sum of contents of Si and Dy in the grain boundary is less than 10 parts by weight based on 100 parts by weight of the an overall amount of an oxide, high temperature IR levels of some samples of 85° C. is reduced to $10^8 \Omega$ or less, as illustrated in FIG. 5.

TABLE 1

| | Ratio (Parts by weight) between Contents of Si and Dy in Grain Boundary | | | Characteristics | | | |
|---|---|---|---|---|---|---|---|
| # | Si | Dy | Si + Dy | BDV | BDV Dispersion | High Temperature Reliability (ohm) | High Temperature IR Dispersion |
| 1 | 1.5 | 1.4 | 2.9 | 41 | X | $2 \times 10^6$ | X |
| 2 | 1.6 | 1.5 | 3.1 | 35 | X | $1 \times 10^6$ | X |
| 3 | 1.8 | 1.7 | 3.5 | 32 | X | $2 \times 10^6$ | X |
| 4 | 2.3 | 1.6 | 3.9 | 27 | X | $3 \times 10^6$ | X |
| 5 | 2.2 | 3.2 | 5.4 | 42 | Δ | $2 \times 10^7$ | Δ |
| 6 | 2.3 | 4.0 | 6.3 | 45 | Δ | $2 \times 10^7$ | Δ |
| 7 | 2.8 | 4.1 | 6.9 | 47 | Δ | $4 \times 10^7$ | Δ |
| 8 | 3.4 | 5.5 | 8.9 | 51 | Δ | $2 \times 10^7$ | Δ |
| 9 | 4.2 | 5.8 | 10.0 | 55 | ◯ | $3 \times 10^8$ | ◯ |
| 10 | 3.9 | 7.5 | 11.4 | 57 | ◯ | $1 \times 10^7$ | Δ |
| 11 | 5.7 | 7.1 | 12.8 | 62 | ◯ | $3 \times 10^8$ | ◯ |
| 12 | 6.5 | 7.2 | 13.7 | 68 | ◯ | $2 \times 10^8$ | ◯ |
| 13 | 7.1 | 7.7 | 14.8 | 68 | ◯ | $1 \times 10^8$ | ◯ |
| 14 | 8.2 | 5.6 | 13.8 | 45 | ◯ | $2 \times 10^7$ | Δ |
| 15 | 7.2 | 7.8 | 15.0 | 48 | ◯ | $2 \times 10^8$ | ◯ |
| 16 | 9.3 | 5.9 | 15.2 | 32 | Δ | $1 \times 10^6$ | X |
| 17 | 9.2 | 6.3 | 15.5 | 35 | Δ | $2 \times 10^6$ | X |
| 18 | 9.1 | 7.0 | 16.1 | 34 | Δ | $1 \times 10^6$ | X |

The following Table 2 represents characteristics of a multilayer capacitor depending on a ratio (Dy/Si) of Dy to Si in a grain boundary with respect to some of the samples of Table 1.

TABLE 2

| | Ratio (Parts by weight) between Contents of Si and Dy in Grain Boundary | | | Characteristics | | | |
|---|---|---|---|---|---|---|---|
| # | Si | Dy | Dy/Si | BDV | BDV Dispersion | High Temperature Reliability (ohm) | High Temperature IR Dispersion |
| 9  | 4.2 | 5.8 | 1.38 | 55 | ○ | $3 \times 10^8$ | ○ |
| 10 | 3.9 | 7.5 | 1.92 | 57 | ○ | $1 \times 10^7$ | Δ |
| 11 | 5.7 | 7.1 | 1.25 | 62 | ○ | $3 \times 10^8$ | ○ |
| 12 | 6.5 | 7.2 | 1.11 | 68 | ○ | $2 \times 10^8$ | ○ |
| 13 | 7.1 | 7.7 | 1.08 | 68 | ○ | $1 \times 10^8$ | ○ |
| 14 | 8.2 | 5.6 | 0.68 | 45 | ○ | $2 \times 10^7$ | Δ |
| 15 | 7.2 | 7.8 | 1.04 | 48 | ○ | $2 \times 10^8$ | ○ |
| 19 | 6.2 | 5.4 | 0.87 | 50 |   | $7 \times 10^6$ | Δ |
| 20 | 5.2 | 7.9 | 1.52 | 54 | ○ | $1 \times 10^8$ | ○ |
| 21 | 4.6 | 7.9 | 1.72 | 52 | Δ | $1 \times 10^8$ | ○ |

Table 2 represents chip characteristics for Dy/Si in samples in which the sum of contents of Si and Dy in the grain boundary is 10 to 15 parts by weight in Table 1.

Referring to Table 2, it may be confirmed that in Samples 9, 11 to 13, 15 and 20 in which a weight ratio of Dy to Si in the grain boundary of the dielectric layer was 1.0 to 1.6, the grain boundary became more uniform and insulation resistance of the grain boundary was sufficiently secured, such that a reduction in a dielectric constant of the multilayer electronic component was further suppressed to further improve reliability of the multilayer electronic component. In Sample 19 in which Dy/Si is 0.87, high temperature reliability appeared to be low.

Figure 6:
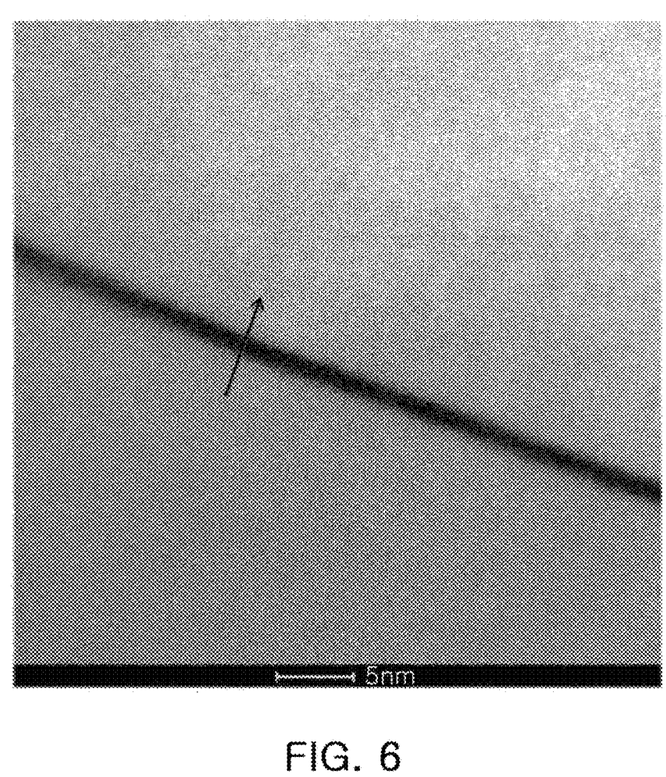
FIG. 6 is a transmission electron microscope (TEM) image illustrating a line profile of a grain boundary layer.
Figure 7:
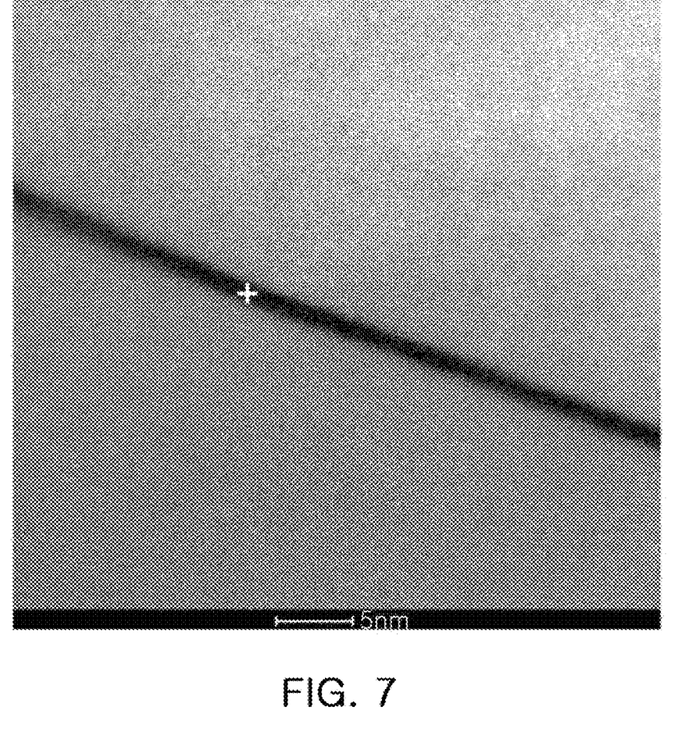
FIG. 7 is a TEM image illustrating a position of an electron beam at the time of analyzing a component.
Figure 8:
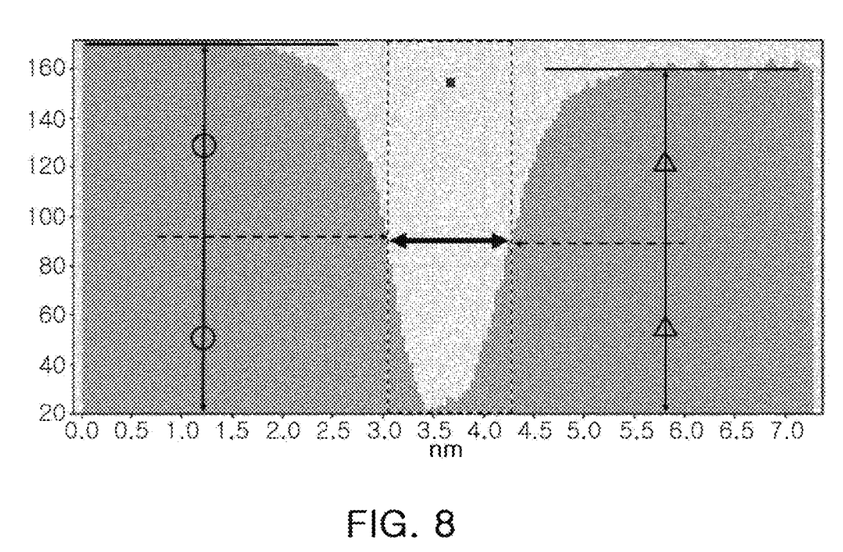
FIG. 8 is a graph illustrating a thickness of a grain boundary layer calculated depending on a contrast difference observed in the line profile of FIG. 6 in order to accurately determine the grain boundary layer.

FIG. 6 is a transmission electron microscope (TEM) image illustrating a line profile of a grain boundary layer, FIG. 7 is a TEM image illustrating a position of an electron beam at the time of analyzing a component, and FIG. 8 is a graph illustrating a thickness of a grain boundary layer calculated depending on a contrast difference observed in the line profile of FIG. 6 in order to accurately determine the grain boundary layer.

First, a thin film sample for TEM observation is manufactured by focused ion beam (FIB) micro-sampling. In addition, Ar milling is performed on the thin film sample to manufacture the thin film sample having a thickness of about 80 nm as a scanning transmission electron microscope (STEM) sample for grain boundary observation.

In addition, an analysis on the grain boundary layer is performed in a state in which a probe diameter of an electron beam is set to about 0.5 nm. In this case, the analysis is performed on only a grain boundary layer that does not have an inclination with respect to an incident electron beam.

FIGS. 6 and 8 illustrate the measurement method for defining the grain boundary thickness. Referring to FIGS. 6 and 8, as in a high-angle annular dark-field imaging (HAADF)-STEM image (magnification×2.25M) of the grain boundary layer, a full width at half maximum (FWHM) of a peak viewed in a line profile of the grain boundary layer is measured and is then defined as a thickness of the grain boundary layer, and components of the grain boundary are analyzed by comparing components of regions having the same thickness with each other.

FIG. 7 illustrates position of additive composition of in the grain boundary. In addition, as illustrated in FIG. 7, information on components of the grain boundary layer may be obtained by irradiating an electron beam to the grain boundary layer that does not have the inclination and one point of the grain boundary in the condition of the probe diameter to perform energy dispersive X-ray spectroscopy (ESD). In this case, measurement was performed on twenty points with respect to each sample to calculate an average value.

As set forth above, according to the exemplary embodiment in the present disclosure, even though the thickness of the dielectric layer is thin, capacitance similar to that of a capacitor in which an existing dielectric composition is used may be implemented, and insulation resistance of the grain boundary may be improved to secure reliability of the multilayer electronic component.

While exemplary embodiments have been shown and described above, it will be apparent to those skilled in the art that modifications and variations could be made without departing from the scope of the present invention as defined by the appended claims.

What is claimed is:

1. A dielectric composition comprising:
   a base material powder including $Ba_mTiO_3$ (0.995≤m≤1.010), $(Ba,Ca)(Ti,Zr)O_3$, $Ba(Ti,Zr)O_3$, or $(Ba,Ca)(Ti,Sn)O_3$ modified from $Ba_mTiO_3$;
   a first accessory component including a variable-valence acceptor element oxide or carbonate of manganese (Mn), chromium (Cr), iron (Fe), cobalt (Co), copper (Cu), or zinc (Zn) and a fixed valence acceptor element oxide or carbonate of magnesium (Mg) or zirconium (Zr);
   a second accessory component including an oxide or a carbonate including silicon (Si) or glass including silicon (Si);
   a third accessory component including BaO or $BaCO_3$; and
   a fourth accessory component including Dy and $V_2O_5$,
   wherein a sum of contents of Si and Dy in a grain boundary formed between adjacent grains of the dielectric composition is 10 to 15 parts by weight based on 100 parts by weight of an overall amount of oxide in the grain boundary.

2. The dielectric composition of claim 1, wherein a content of Mg of the first accessory component is 0.5 parts by weight or less based on 100 parts by weight of an overall amount of oxide and carbonate.

3. The dielectric composition of claim 1, wherein the second accessory component further includes an oxide or a carbonate including aluminum (Al).

4. The dielectric composition of claim 1, wherein the fourth accessory component further includes a rare earth element of Y, Gd, Sm, Nd, Tb, Eu, Yb, Er, and Lu.

5. The dielectric composition of claim 1, wherein a ratio of a content of Dy to a content of Si in the grain boundary formed between adjacent grains of the dielectric composition is 1.0 to 1.6.

6. A multilayer electronic component comprising:
a body including first and second internal electrodes alternately disposed with respective dielectric layers interposed therebetween; and
first and second external electrodes disposed on the body to be connected to the first and second internal electrodes, respectively,
wherein the dielectric layers include the dielectric composition of claim 1.

7. A multilayer electronic component comprising:
a body including first and second internal electrodes alternately disposed with respective dielectric layers interposed therebetween; and
first and second external electrodes disposed on the body to be connected to the first and second internal electrodes, respectively,
wherein each of the dielectric layers includes $Ba_mTiO_3$ ($0.995 \leq m \leq 1.010$) and includes a plurality of grains and grain boundaries formed between adjacent grains, and
a sum of contents of Si and Dy in the grain boundaries is 10 to 15 parts by weight, based on 100 parts by weight of an overall amount of oxide in the grain boundaries.

8. The multilayer electronic component of claim 7, wherein in the grain boundary of the dielectric layer, a ratio (Dy/Si) of Dy to Si by weight is 1.0 to 1.6.

9. The multilayer electronic component of claim 7, wherein a thickness of the grain boundary of the dielectric layer is within a range from 0.7 to 1.5 nm.

10. The multilayer electronic component of claim 7, wherein the grain boundary of the dielectric layer includes a dielectric grain having a core-shell structure, and
a size of the grain is 50 to 500 nm, and a thickness of the dielectric layer is 0.9 μm or less.

11. The multilayer electronic component of claim 7, wherein a thickness deviation ((thickness standard deviation/thickness average value)×100) of the grain boundary is 10 or less.

12. The multilayer electronic component of claim 7, wherein the first and second internal electrodes include Ni or Ni alloys.

13. A dielectric composition comprising:
a base material powder including $Ba_mTiO_3$ ($0.995 \leq m \leq 1.010$);
a first accessory component including a variable-valence acceptor element oxide or carbonate of manganese (Mn), chromium (Cr), iron (Fe), cobalt (Co), copper (Cu), or zinc (Zn) and a fixed valence acceptor element oxide or carbonate of magnesium (Mg) or zirconium (Zr);
a second accessory component including an oxide or a carbonate including silicon (Si) or glass including silicon (Si);
a third accessory component including BaO or $BaCO_3$; and
a fourth accessory component including Dy and $V_2O_5$,
wherein a content of Si in a grain boundary formed between adjacent grains of the dielectric composition is at least 4.2 parts by weight based on 100 parts by weight of an overall amount of oxide in the grain boundary, and
wherein a ratio of a content of Dy to a content of Si in a grain boundary formed between adjacent grains of the dielectric composition is 1.0 to 1.6.

14. The dielectric composition of claim 13, wherein a sum of contents of Si and Dy in the grain boundary formed between adjacent grains of the dielectric composition is 10 to 15 parts by weight based on 100 parts by weight of an overall amount of oxide in the grain boundary.

15. The dielectric composition of claim 13, wherein the base material powder further includes $(Ba,Ca)(Ti,Zr)O_3$, $Ba(Ti,Zr)O_3$, or $(Ba,Ca)(Ti,Sn)O_3$ modified from $Ba_mTiO_3$.

16. The dielectric composition of claim 13, wherein the second accessory component further includes an oxide or a carbonate including aluminum (Al).

17. The dielectric composition of claim 13, wherein the fourth accessory component further includes a rare earth element of Y, Gd, Sm, Nd, Tb, Eu, Yb, Er, and Lu.

18. A multilayer electronic component comprising:
a body including first and second internal electrodes alternately disposed with respective dielectric layers interposed therebetween; and
first and second external electrodes disposed on the body to be connected to the first and second internal electrodes, respectively,
wherein the dielectric layers include the dielectric composition of claim 13.

\* \* \* \* \*